United States Patent
Zayatz

(10) Patent No.: US 7,722,992 B1
(45) Date of Patent: May 25, 2010

(54) SELF-CENTERING CURRENT COLLECTOR FOR AN ELECTROCHEMICAL CELL

(75) Inventor: Robert Zayatz, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 1030 days.

(21) Appl. No.: 11/420,880

(22) Filed: May 30, 2006

Related U.S. Application Data

(63) Continuation-in-part of application No. 10/870,740, filed on Jun. 17, 2004, now abandoned.

(60) Provisional application No. 60/478,990, filed on Jun. 17, 2003.

(51) Int. Cl.
 H01M 4/64 (2006.01)
 H01M 4/72 (2006.01)
 B21C 27/00 (2006.01)

(52) U.S. Cl. ............... 429/233; 429/245; 428/599

(58) Field of Classification Search ............... None
 See application file for complete search history.

(56) References Cited

U.S. PATENT DOCUMENTS

| | | | |
|---|---|---|---|
| 627,134 A | 6/1899 | McDougall | |
| 669,085 A | 3/1901 | Heidel | |
| 845,048 A | 2/1907 | Bijur | |
| 977,443 A | 12/1910 | Ford | |
| 1,371,661 A | 3/1921 | Andreae | |
| 1,437,468 A | 12/1922 | Ford | |
| 1,600,083 A | 9/1926 | Webster | |
| 1,607,304 A | 11/1926 | Rich | |
| 2,503,970 A | 4/1950 | Rupp | |
| 3,083,250 A | 3/1963 | Geissbauer | |
| 3,282,657 A * | 11/1966 | Bright | 428/575 |
| 3,453,145 A | 7/1969 | Duddy | |
| 3,981,742 A | 9/1976 | Yonezu et al. | |
| 3,989,539 A | 11/1976 | Grabb | |
| 4,118,553 A | 10/1978 | Buckethal et al. | |
| 4,125,690 A | 11/1978 | Bagshaw et al. | |
| 4,129,692 A | 12/1978 | King et al. | |
| 4,221,852 A | 9/1980 | Qureshi | |
| 4,310,609 A | 1/1982 | Liang et al. | |
| 4,320,183 A | 3/1982 | Qureshi | |
| 4,391,729 A | 7/1983 | Liamg et al. | |
| 4,830,940 A | 5/1989 | Keister et al. | |
| 4,964,877 A | 10/1990 | Keister et al. | |
| 5,114,811 A | 5/1992 | Ebel et al. | |
| 5,169,659 A | 12/1992 | Fleischmann et al. | |
| 5,250,373 A | 10/1993 | Muffoletto et al. | |
| 5,308,719 A | 5/1994 | Mrotek et al. | |
| 5,435,874 A | 7/1995 | Takeuchi et al. | |
| 5,443,928 A | 8/1995 | Takeuchi et al. | |
| 5,472,810 A | 12/1995 | Takeuchi et al. | |
| 5,516,340 A | 5/1996 | Takeuchi et al. | |
| 5,571,640 A | 11/1996 | Takeuchi et al. | |
| 5,582,936 A | 12/1996 | Mrotek et al. | |
| 5,834,141 A | 11/1998 | Anderson et al. | |
| 6,110,622 A | 8/2000 | Frysz et al. | |
| 6,541,158 B2 | 4/2003 | Frysz et al. | |
| 6,613,474 B2 | 9/2003 | Frustaci et al. | |

* cited by examiner

Primary Examiner—John S Maples
(74) Attorney, Agent, or Firm—Michael F. Scalise

(57) ABSTRACT

A current collector for an electrode of an electrochemical cell is described. The current collector has a peripheral edge between first and second major faces, the edge comprising at least a first edge contiguous with a second edge angled with respect to each other. A protrusion extends outwardly from the junction of the first and second edges. This protrusion helps to precisely position the current collector in a pressing fixture. That way, active material is contacted to each of the major faces of the current collector and is of a uniform thickness about its edges. Later, when the resulting electrode plate is assembled into an electrochemical cell, such as of a multi-plate construction, the protrusion also serves to maintain strict alignment of the plate inside the casing.

11 Claims, 8 Drawing Sheets

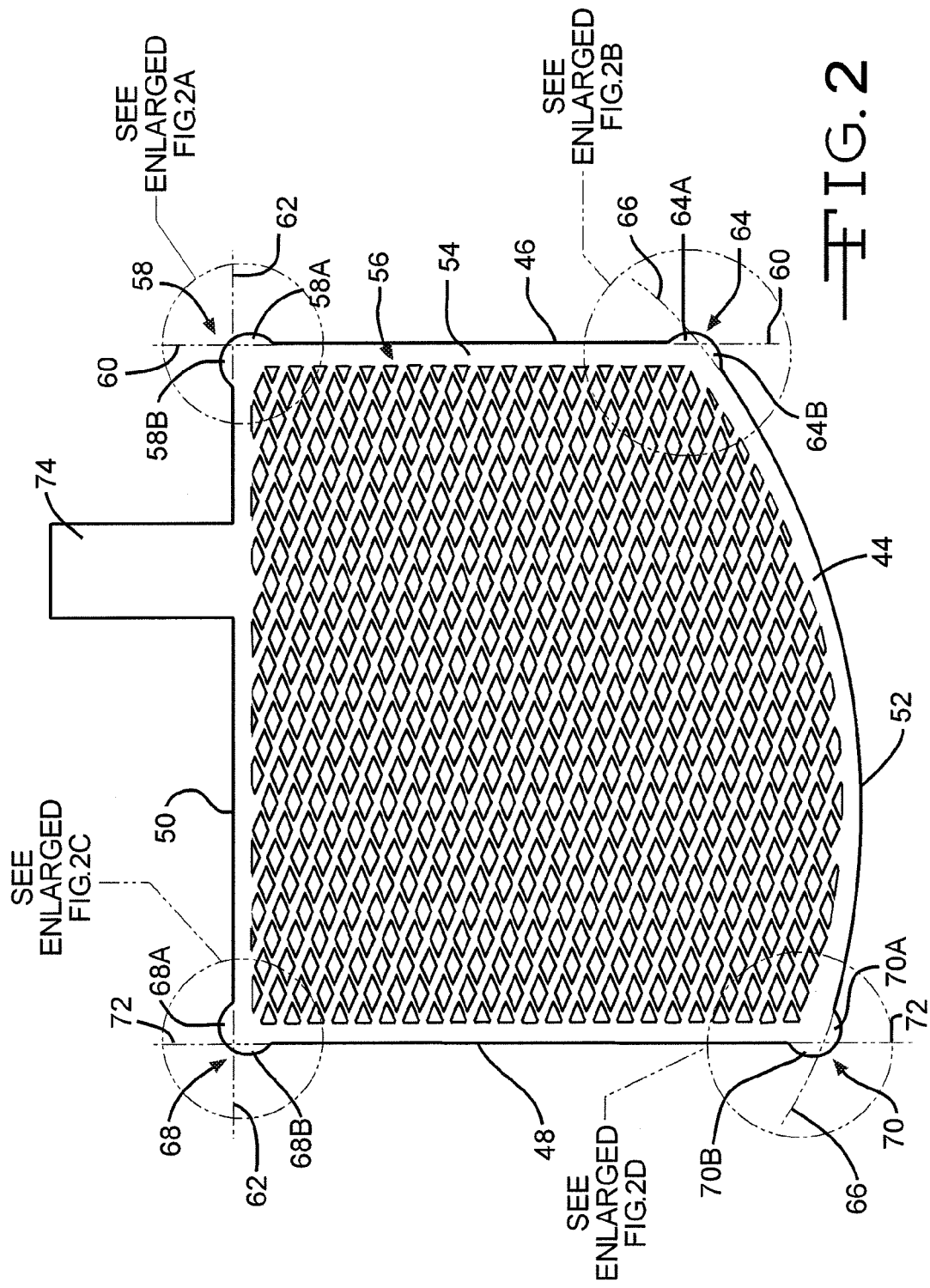

SELF-CENTERING CURRENT COLLECTOR FOR AN ELECTROCHEMICAL CELL

CROSS-REFERENCE TO RELATED APPLICATIONS

The present application is a continuation-in-part of application Ser. No. 10/870,740, filed Jun. 17, 2004, now abandoned, which claims priority from provisional application Ser. No. 60/478,990, filed Jun. 17, 2003.

BACKGROUND OF THE INVENTION

1. Field of the Invention

The present invention relates to electrochemical cells generating electrical energy by means of a chemical reaction. Electrolytic cells, for example of the lithium/silver vanadium oxide (Li/SVO) type, are typically constructed of one or more layers of anode, separator, and cathode. A screen or foil current collector is enclosed in the anode and cathode to transport electrons. An electrode assembly may be built by stacking multiple layers or plates on top of each other or by winding one or more long strips of the stacked layers around a mandrel. The electrode assembly is placed inside a case and immersed in an electrolyte, which transports ions.

One of the concerns in constructing an electrochemical cell is ensuring that the anode and cathode electrodes are properly aligned. This is not as great a problem is jellyroll electrode assemblies where the electrodes are of plates that are substantially longer than they are wide. The electrodes are then laid one on top of the other and spirally wound into the jellyroll configuration.

However, in an electrochemical cell having a multi-plate construction, electrode misalignment is a concern. Misalignment results in there being electrode plates that are not directly opposed by plates of an opposite polarity. In that respect, electrode plate misalignment detracts from the cell's discharge efficiency, as there will be active material that may not be fully reacted during electrochemical discharge. This is particularly likely to occur at the electrode edges.

The present invention prevents such misalignment by providing at least one of the electrode current collectors with projections emanating from its corners. These protrusions help to precisely position the current collector in a pressing fixture for contacting an active material to both sides thereof. That way, active material is contacted to each of the major faces of the current collector and is of a uniform thickness about its edges. Later, when the electrode plate is assembled into an electrochemical cell, such as of a multi-plate construction, the protrusions also serve to maintain strict alignment of the plate inside the casing.

Without protrusions according to the present invention, it is possible for the current collector to be positioned inside a pressing fixture with one portion of its edge too close to the fixture sidewall and another portion positioned too far away from the fixture. The result is that there is too much active material at the current collector edge spaced from the fixture sidewall and not enough at the other edge. This unbalanced active material contact can result in diminished discharge efficiency when the plate is incorporated into an electrochemical cell.

2. Prior Art

U.S. Pat. Nos. 627,134 to McDougall and 1,600,083 to Webster relate to current collectors having apertured projections. The projections do not contact the casing sidewall to ensure proper alignment. Instead, they receive locking rods for maintaining alignment inside a battery. Also, the prior art projections are not capable of centering the current collector in a pressing fixture. For example, with a generally rectangular shaped current collector, the centering projections must emanate from the corners at about a 45° angle, or essentially centered between the two contiguous sides. That way, with the current collector positioned in a fixture having the protrusion nested in a fixture corner, the immediately adjacent current collector sides are spaced from the pressing fixture sidewall by a like distance. The prior art current collectors do not provide for this type of centering as their protrusions emanate from a current collector edge adjacent to a corner. A corner emanating protrusion provides for proper spacing along the current collector edge having the protrusion, but not along the adjacent edge.

An example of this is shown with the current collector 10 illustrated in FIG. 1. The current collector 10 comprises first and second major faces 12 and 14 extending to a surrounding perimeter edge formed by opposed right and left edges 16 and 18 extending to upper and lower edges 20 and 22. The right and left edges 16, 18 and the upper edge 20 are straight while the lower edge 22 is curved. The current collector 10 has an interior perforated region 24. Spaced apart protrusions 26 and 28 emanate from the upper edge 20 adjacent to the respective right and left edges 16 and 18. Similarly, spaced apart protrusions 30 and 32 emanate from the curved edge 22 adjacent to the respective right and left edges 16 and 18. Having a protrusion only emanating from one edge of a current collector, instead of a corner between adjacent edges, means that there is no structure for regulating the spacing of the other current collector edge within a pressing fixture or a casing sidewall, as the case may be. In other words, protrusion 26 correctly spaced the upper edge 20 from a fixture sidewall (not shown), but is incapable of regulating the distance between the fixture and the right edge 16 of the current collector 10. A similar problem exists with respect to protrusion 30 and edge 16 and protrusions 28 and 32 and edge 18.

Thus, there is a need for a current collector design that enhances alignment in a pressing fixture so that a desired thickness of active material contacts both major current collector faces and the surrounding edge. Additionally, the current collector must provide for proper alignment with the opposite polarity electrode when it is incorporated into an electrode assembly housed inside a cell casing. The present current collector design provides both of these benefits.

SUMMARY OF THE INVENTION

The present invention is directed to a current collector design that ensures proper alignment of the current collector in both a pressing fixture for production of an electrode plate and later when the plate is incorporated into a electrode assembly. Providing the current collector with protrusions emanating from its corners does this, regardless whether the current collector is of a generally square shape having edges of substantially similar lengths or of a rectangular shape. In the latter case, the current collector can be significantly longer than it is wide as in a jellyroll electrode assembly, or not as in a prismatic cell design. In any event, the protrusions emanate from the corners centered between the edges. That way, they provide for spacing the current collector from the fixture sidewall a similar distance at the adjacent edges. This ensures a uniform thickness of active material contacted to the current collector at the edges. After the electrode plate has been built, the protrusions provide for properly aligning the electrode plate housed inside the casing.

The foregoing and additional advances and characterizing features of the present invention will become clearly apparent upon reading the ensuing description together with the included drawings wherein:

BRIEF DESCRIPTION OF THE DRAWINGS

FIG. 2 is a side elevational view of a current collector 40 according to the present invention.

DETAILED DESCRIPTION OF THE INVENTION

Figure 2A:
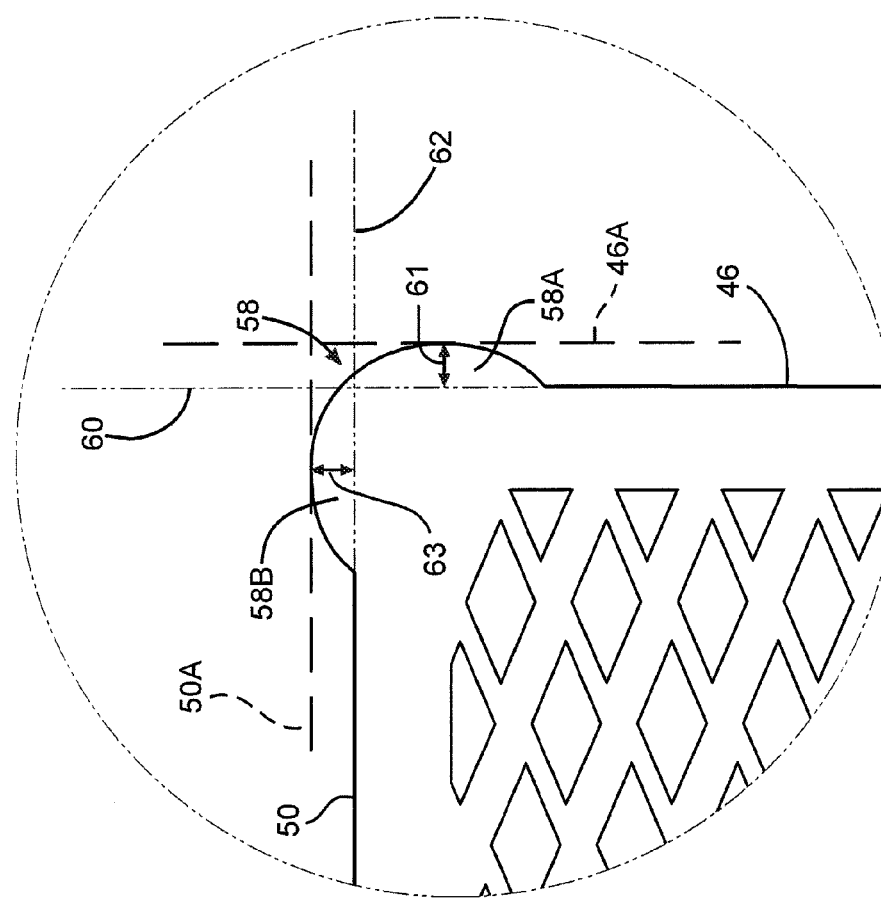
FIGS. 2A to 2D are enlarged views of the indicated area in FIG. 2.
Figure 2B:
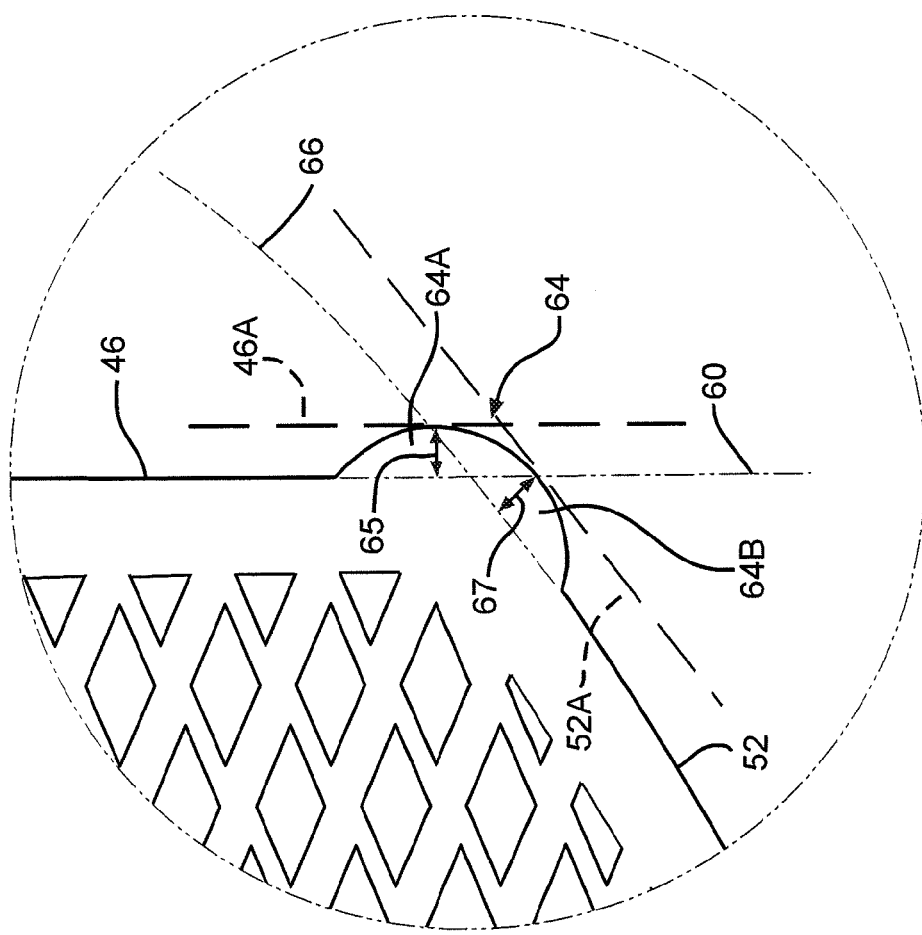
Figure 2C:
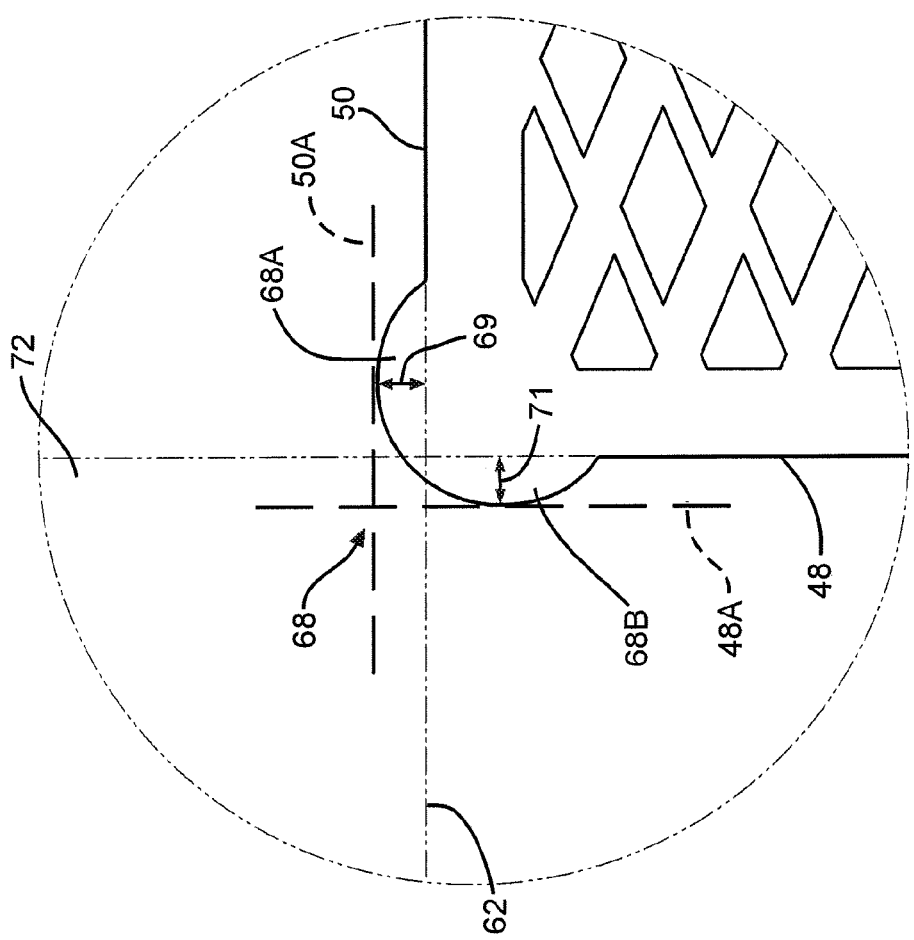
Figure 2D:
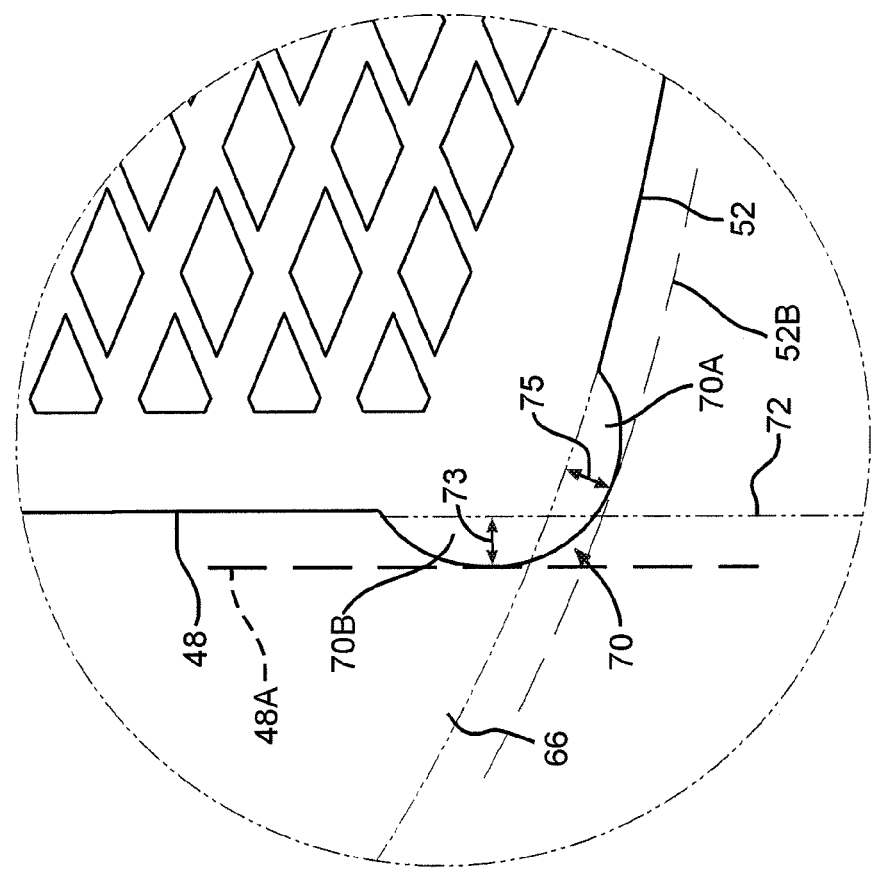
Figure 3:
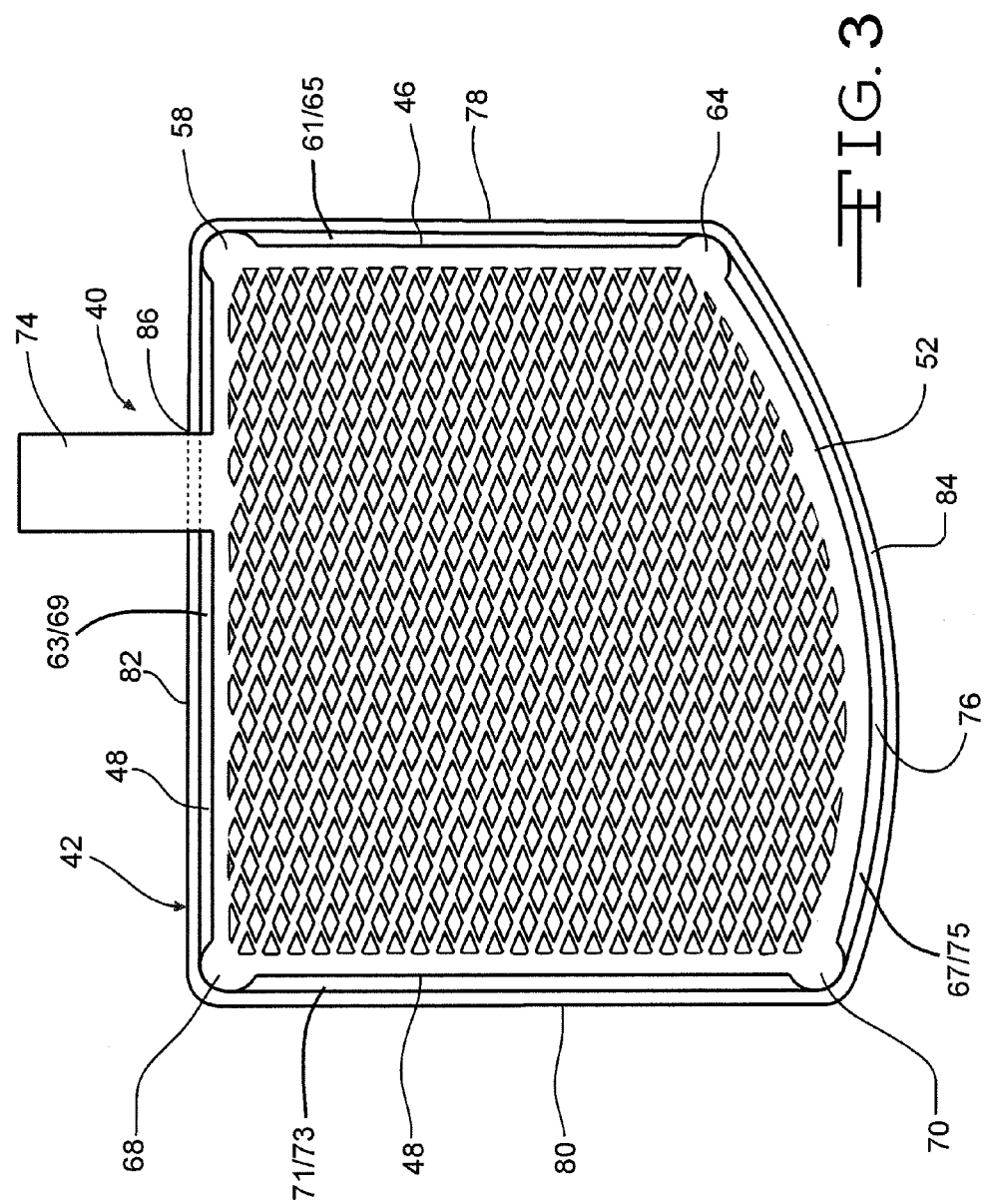
FIG. 3 is a plan view showing the current collector 40 of FIG. 2 is a pressing fixture 42 for forming an electrode plate.

Referring now to the drawings, FIGS. 2 and 3 illustrate an exemplary current collector 40 according to the present invention positioned within a pressing fixture 42. The current collector 40 is a conductive member, typically selected from such materials as nickel, aluminum, stainless steel (for example according to U.S. Pat. No. 5,114,811 to Frysz et al.), mild steel, titanium, tantalum, platinum, gold, and cobalt-alloys (U.S. Pat. Nos. 6,541,158 and 6,110,622, both to Frysz et al.). These patents are assigned to the assignee of the present invention and incorporated herein by reference.

With respect to the orientation shown in the drawings, the current collector 40 comprises first and second major faces (only face 44 is shown) extending to a surrounding perimeter edge. Opposed right and left edges 46 and 48 extending to and meeting with upper and lower edges 50 and 52 form the perimeter edge. The right and left edges 46, 48 and the upper edge 50 are generally planar or straight while the lower edge 52 is curved. The current collector 40 has a solid frame 54 bordered by the edges and extending inwardly a relatively short distance to an interior perforated region 56. The perforations are shown having the shape of diamonds, although virtually any opening shape is contemplated by the scope of the invention. This includes an expanded screen. Also, the current collector 40 need not be perforated at all, but instead, can be a solid member.

A first protrusion 58 emanates from the junction of the contiguous right and upper edges 46 and 50. In FIG. 2, an imaginary projection of the right edge 46 is depicted by dashed line 60 and an imaginary projection of the upper edge 50 is depicted by dashed line 62. The dashed lines 60 and 62 form a right angle. A first portion 58A of the protrusion 58 resides between the dashed line 60 aligned with the right edge 46 and the protrusion perimeter. Similarly, a second portion 58B of the protrusion resides between the dashed line 62 aligned with the upper edge 50 and the protrusion perimeter. The protrusion 58 is preferably centered at the corner of the right and upper edges 46, 50 with protrusion portions 58A and 58B being substantially equal.

As shown in the enlarged view of FIG. 2A, a first distance 61 from the right edge 46 of the current collector to a distant most tangent 46A of the perimeter of the first protrusion portion 58A adjacent to the right edge 46 is substantially equal to a second distance 63 from the upper edge 50 to a distant most tangent 50A of the perimeter of the second protrusion portion 58B adjacent to the upper edge. The significance of this will be described in detail with respect to FIG. 3.

A second protrusion 64 emanates from the junction of the contiguous right and lower edges 46 and 52. The dashed line 60 aligned with the right edge 46 of the current collector passes through this projection, as does an imaginary projection of the curved lower edge 52 depicted by the dashed line 66. The angle between the dashed lines 60 and 66 is obtuse. A first portion 64A of the protrusion 64 resides between the dashed line 60 aligned with the right edge 46 and the protrusion perimeter. Similarly, a second portion 64B of the protrusion resides between the dashed line 66 aligned with the curved bottom edge 52 and the protrusion perimeter. The protrusion 64 is preferably centered at the corner of the right and lower edges 46, 52 with protrusion portions 64A and 64B being substantially equal.

As shown in the enlarged view of FIG. 2B, a first distance 65 from the right edge 46 of the current collector to the distant most tangent 46A of the perimeter of the first protrusion portion 64A adjacent to the right edge 46 is substantially equal to a second distance 67 from the lower edge 52 to a distant most tangent 52A of the perimeter of the second protrusion portion 64B adjacent to the lower edge. The distant most tangent 46A also defines the first distance 61 from the right edge 46 of the first portion 58A of protrusion 58. The significance of this will be described in detail hereinafter with respect to FIG. 3.

The current collector 40 is also provided with a protrusion 68 at the junction of the contiguous left and upper edges 48, 50 and a protrusion 70 at the junction of the contiguous left and bottom edges 48, 52. An imaginary projection of the left edge 48 is depicted by dashed line 72. In that respect, protrusion 68 includes a first portion 68A that resides between the dashed line 62 aligned with the upper edge 50 and the protrusion perimeter. A second portion 68B of the protrusion 68 resides between the dashed line 72 aligned with the left edge 48 and the protrusion perimeter. The protrusion 68 is preferably centered at the corner of the left and upper edges 48, 50 with protrusion portions 68A and 68B being substantially equal.

As shown in the enlarged view of FIG. 2C, a first distance 69 from the upper edge 50 of the current collector to the distant most tangent 50A of the perimeter of the first protrusion portion 68A adjacent to the upper edge 50 is substantially equal to a second distance 71 from the left edge 48 to the distant most tangent 48A of the perimeter of the second protrusion portion 68B adjacent to the left edge. The distant most tangent 50A also defines the second distance 63 from the upper edge 50 of the second portion 58B of protrusion 58.

The other protrusion 70 has first and second portions 70A and 70B residing between the imaginary line projections 66 and 72 of the respective curved lower edge 52 and the left edge 48 and its perimeter. The protrusion 70 is preferably centered at the corner of the left and lower edges 48, 52 with protrusion portions 70A and 70B being substantially equal.

As shown in the enlarged view of FIG. 2D, a first distance 73 from the left edge 48 of the current collector edge to the distant most tangent 48A of the perimeter of the second protrusion portion 70B adjacent to the left edge 48 is substantially equal to a second distance 75 from the curved lower edge 52 to a distant most tangent 52B of the perimeter of the first protrusion portion 70A adjacent to the lower edge. The distant most tangent 48A also defines the second distance 71 from the left edge 48 of the second portion 68B of protrusion 68. Again, the significance of this will be described in detail hereinafter with respect to FIG. 3.

A tab 74 extending from the upper side 50 completes current collector 40.

As shown in FIG. 3, the current collector 40 is received in the pressing fixture 42 comprising a bottom wall 76 supporting upstanding right and left sidewalls 78 and 80 and upstanding upper and lower sidewalls 82 and 84. The sidewalls meet each other at curved corners and surround an opening leading into the fixture. A gap 86 is provided in the upper sidewall 82 to receive the current collector tab 74.

The fixture 42 is used to build an electrode plate containing the current collector 40. This is done by first loading an electrode active material (not shown) therein. The active material is preferably in a granular form or a blank cut from a freestanding sheet and has a substantially uniform thickness such that its upper surface is spaced below the upper edge of the fixture sidewalls 78, 80, 82 and 84. The current collector 40 is then moved into the fixture 42 lying on top of the active material. In this position, protrusion 58 nests into contact with the curved corner between the right and upper fixture sidewalls 78, 82. Similarly, protrusion 68 nests into contact with the curved corner between the upper and left fixture sidewalls 82, 80, protrusion 70 nests into contact with the curved corner between the left and bottom fixture sidewalls 80, 84, and protrusion 64 nests into contact with the curved corner between the bottom and left fixture sidewalls 84, 80.

The protrusions 58, 64, 68 and 70 are of substantially the same size, i.e., of a similar radius, to ensure that there is equal spacing between the current collector edges and the immediately adjacent fixture sidewalls. This means that the distance between the right current collector edge 46 and the fixture sidewall 78 (the distances 61 and 65 from the right current collector edge 46 to the distant most tangent 46A of the respective protrusion portions 58A and 64A) is the same as the distance between the upper current collector edge 50 and upper fixture sidewall 82 (the distances 63 and 69 from the upper current collector edge 50 and the distant most tangent 50A of the respective protrusion portions 58B and 68B), the left current collector edge 48 and left fixture sidewall 80 (the distances 71 and 73 from the left current collector edge 48 and the distant most tangent 48A of the respective protrusion portions 68B and 70B), and between the lower current collector edge 52 and the lower fixture sidewall 84 (the distances 67 and 75 from the lower current collector edge 52 and the distant most tangents 52A, 52B of the respective protrusion portions 64B, 70A). If desired, however, the various protrusions can be off center in their respective corners and of unequal radii.

With the current collector 40 so positioned in the fixture 42, another charge of active material is provided on top of the current collector. This active material, current collector, active material sandwich is then subjected to a pressing force sufficient to contact the active material to the major current collector faces and locked thereon through the perforations 54. A suitable pressing force is about 10 to 20 tons/in$^2$ for about 30 to 60 seconds. In that manner, the protrusions ensure that there is a uniform amount of active material about the entire periphery of the current collector. A suitable process for forming blanks of active material is described in U.S. Pat. Nos. 5,435,874 and 5,571,640, both to Takeuchi et al. U.S. Pat. Nos. 4,830,960 and 4,964,877, both to Keister et al. describe a method for making an electrode component using a pressing fixture. All of these patents are assigned to the assignee of the present invention and incorporated herein by reference.

The thusly-manufactured electrode component can be either a cathode plate for a primary or secondary cell, or an anode plate for a secondary cell.

Figure 4:
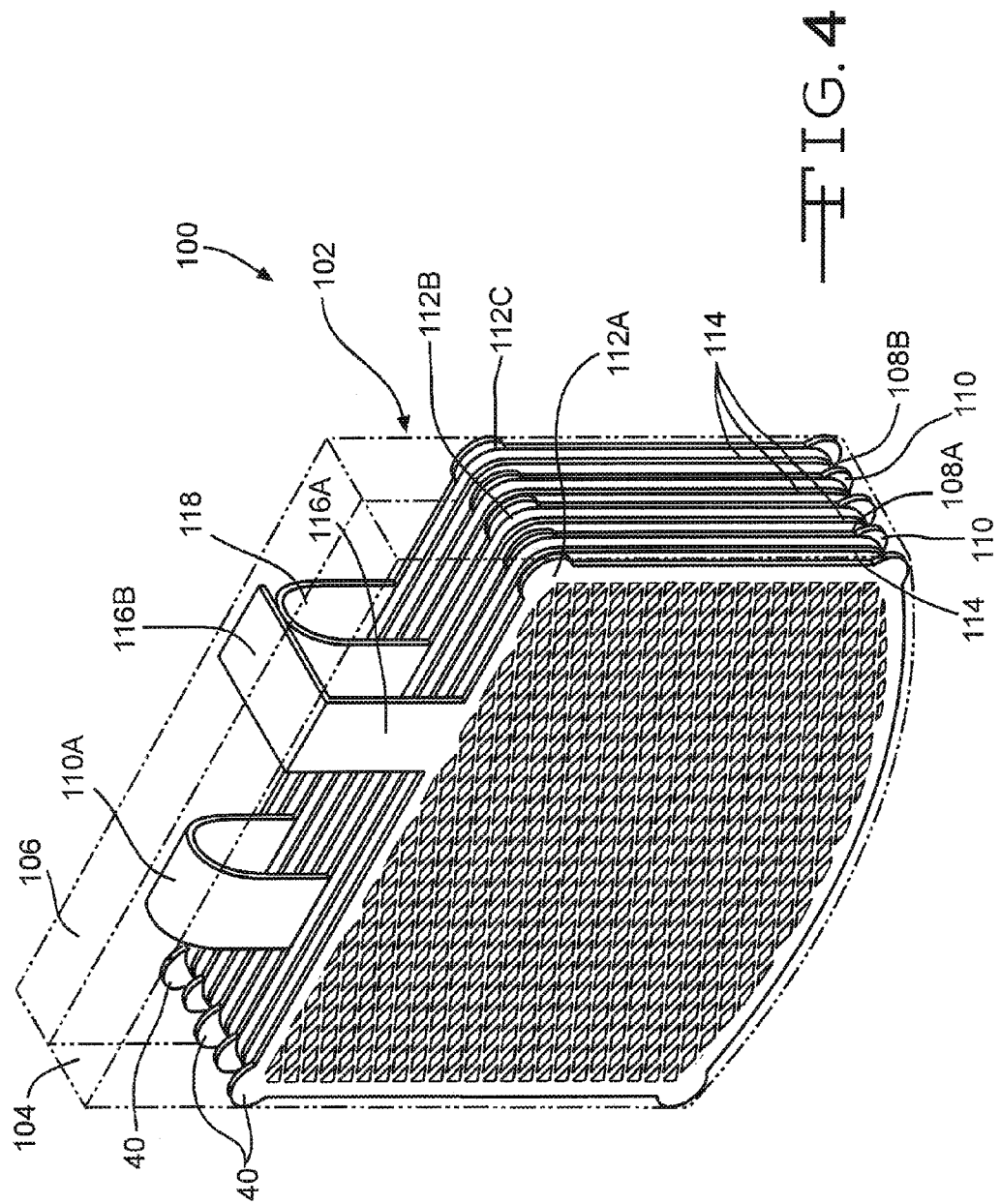
FIG. 4 is a perspective view of a cell 100 comprising a casing 102 in a shadowed outline containing both anode and cathode plates with the anode plates connected to the case.

FIG. 4 illustrates an electrochemical cell 100 incorporating the current collector 40 of the present invention. The electrode assembly for the cell has both anode and cathode plates with the anode plates comprising the current collector 40 and electrically connected to the casing 102 serving as the negative terminal in a case-negative cell design. The casing 102 is of mating first and second clamshell portions 104 and 106 as described in U.S. Pat. No. 6,613,474 to Frustaci et al., which is assigned to the assignee of the present invention and incorporated herein by reference. However, as those who are skilled in the art will realize, the present invention current collector 40 is useful with any casing design including prismatic, cylindrical, or button shapes. The casing 102 is of a conductive material, such as of stainless steel or titanium.

Figure 1:
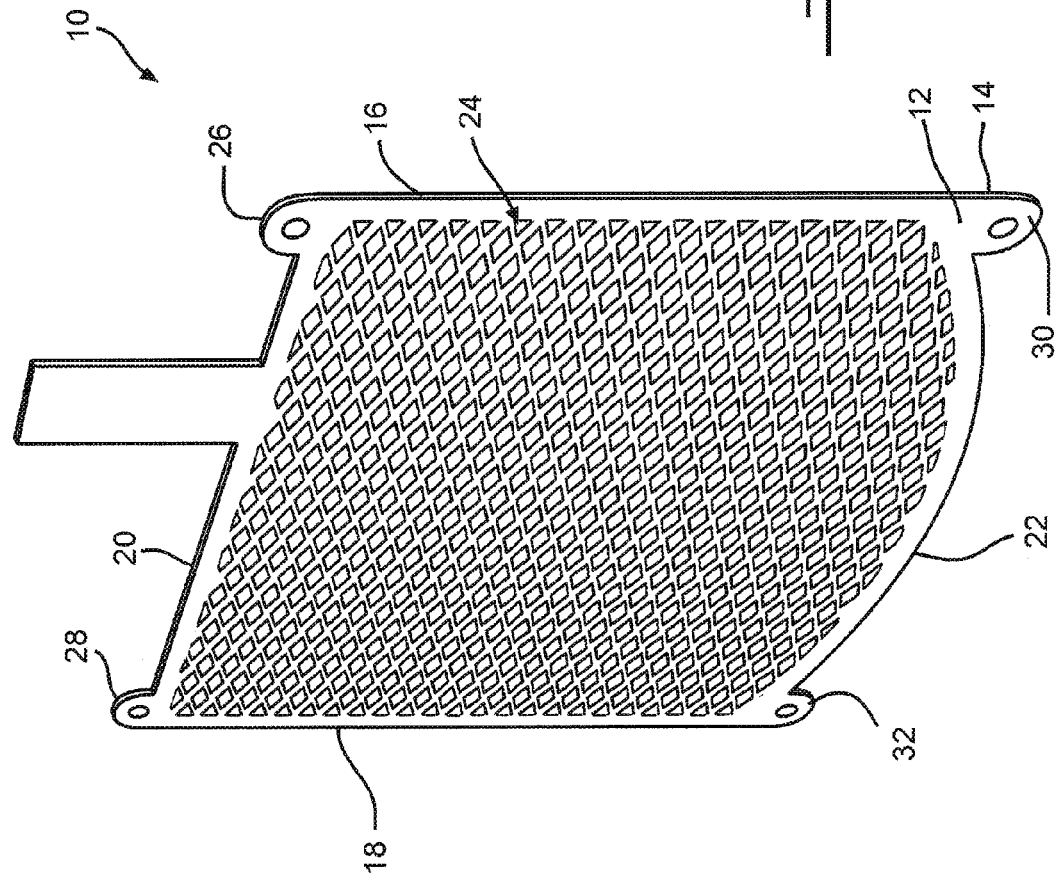
FIG. 1 is a perspective view of an exemplary current collector 10 according to the prior art.

The casing is adapted for housing various types of electrochemical chemistries such as alkali metal/solid cathode or alkali metal/oxyhalide electrochemical cells of both the solid cathode and liquid cathode types. The electrochemical cell 100 illustrated in FIG. 4 is of the liquid electrolyte type comprising a cathode electrode having a body of solid cathode material in the form of plates 108A and 108B comprising cathode active material pressed together and bonded against a cathode current collectors 110 that are of a similar shape, but somewhat smaller in size than the current collector 40 described in FIGS. 1 to 3 and being used for the anode electrode. This is because the anode current collectors 40 contact the inner surface of the casing 102 in the case-negative design. The cathode current collectors 110 for plates 108A and 108B are provided with a U-shaped tab 110A connecting between them. This type of construction is referred to as a butterfly current collector, and is described in U.S. Pat. No. 5,250,373 to Muffoletto et al., the disclosure of which is hereby incorporated by reference. The U-shaped tab 110A of the cathode is then connected to a terminal (not shown) insulated from the casing by a glass-to-metal seal (not shown), as is well known by those skilled in the art. Other cathode current collector designs can also be used. The cathode active material is preferably comprised of a metal, a metal oxide, a mixed metal oxide, a metal sulfide or a carbonaceous material.

The cell 100 further includes an anode electrode comprised of anode active plates 112A, 112B and 112C, preferably of lithium sheets pressed to the opposite sides of the present invention current collector 40. The outermost anode plates 112A and 112C are only provided with lithium on their inner surfaces facing cathode plates 108A and 108B, respectively. The anode current collector 40 is fabricated from a thin sheet of metal such as of nickel. The anode plates are in operative contact with the cathode plates through a thin sheet of separator material 114. The separator divides the cathode and anode plates to prevent shorting by direct physical contact between the electrode plates while allowing ions to move between the plates.

The anode current collector tabs can be an individual piece attached to the case wall or, alternatively, they can be in the form of a U-shaped member connecting between two anode current collectors 40. In cell 100, anode plate 112A has its current collector 40 provided with a tab having a portion 116A planar therewith and a bent portion 116B that is contacted to the casing 102, such as by welding. Anode plates 112B and 112C are provide with a U-shaped tab 118 connecting between them. The mid-point or apex of the U-shaped tab 118 is joined to the tab portion 116B, preferably by welding. The anode tabs are made of the same material as the current collector, preferably nickel, however, other materials also may be satisfactory.

By way of example, in an illustrative primary cell, the active material of the cathode body is a silver vanadium oxide cathode material as described in U.S. Pat. Nos. 4,310,609 and 4,391,729 or copper silver vanadium oxide as described in U.S. Pat. Nos. 5,472,810 and 5,516,340, all assigned to the assignee of the present invention, the disclosures of which are hereby incorporated by reference. The cathode current collectors 110 can be titanium, the cathode terminal lead can be molybdenum, and the separators 114 can be of polypropylene. The activating electrolyte can be a 1.0M to 1.4M solution of $LiAsF_6$ or $LiPF_6$ in a 50:50 mixture of, by volume, 1,2-dimethoxyethene and propylene carbonate. The glass seal can be of TA-23 Hermetic sealing glass, while the casing can be of stainless steel.

This electrochemical system is of a primary cell type. However, those skilled in the art will readily recognize that the casing of the present invention is readily adopted to house both primary electrochemical systems of either a solid cathode or liquid catholyte type, or a secondary cell such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, "hairy carbon" etc.), which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

The current collector of the present invention can also be employed in a cell having a case-positive electrical configuration. In particular, replacing lithium anode elements with cathode plates provides a case-positive electrical configuration. Accordingly, cathode plates would be replaced by lithium anode plates, sandwiched together and against the current collector of the present invention serving as an anode current collector that, in turn, is connected to the terminal lead and insulated from the casing by the glass-to-metal seal. In all other respects, the anode current collector in the case-positive configuration is similar to that previously described with respect to cell 100 having the case-negative configuration.

The present invention may also be used with acid or alkaline-based batteries.

Now, it is therefore apparent that the present invention accomplishes its intended objects. While embodiments of the present invention have been described in detail, that is for the purpose of illustration, not limitation.

What is claimed is:

1. A current collector for an electrical energy storage device, the current collector comprising:
   a) a first major face;
   b) a second major face;
   c) a peripheral edge between the first and second major faces, wherein the peripheral edge comprises at least a first edge portion contiguous with a second edge portion angled with respect to each other; and
   d) a protrusion extending outwardly from the junction of the first and second edge portions, wherein a first protrusion portion resides between a first imaginary extension of the first edge portion of the current collector and a perimeter of the protrusion and a second protrusion portion resides between a second imaginary extension of the second edge portion of the current collector and the protrusion perimeter so that a first distance from the first imaginary extension to a first distant-most tangent of the protrusion perimeter furthest from the first imaginary extension edge is substantially equal to a second distance from the second imaginary extension to a second distant-most tangent of the protrusion perimeter furthest from the second imaginary extension.

2. The current collector of claim 1 wherein equal portions of the protrusion reside along each of the first and second edge portions.

3. The current collector of claim 1 wherein the first and second edge portions of the current collector are disposed at either a right or an obtuse angle with respect to each other.

4. The current collector of claim 1 wherein the first and second edge portions of the current collector are straight.

5. The current collector of claim 1 wherein at least one of the first and second edge portions of the current collector is curved.

6. The current collector of claim 1 wherein the current collector has at least four edge portions with a protrusion disposed at the junction of each of the contiguous edge portions.

7. An electrochemical cell, which comprises:
   a) a first electrode;
   b) a second, counter electrode;
   c) an electrolyte activating the first and second electrodes; and
   d) wherein at least one of the electrodes comprises a current collector comprising:
      i) a first major face;
      ii) a second major face;
      iii) a peripheral edge between the first and second major faces, wherein the edge comprises a first edge portion contiguous with a second edge portion; and
      iv) a protrusion extending outwardly from a junction of the first and second edge portions, wherein a first protrusion portion resides between a first imaginary extension of the first edge portion of the current collector and a perimeter of the protrusion and a second protrusion portion resides between a second imaginary extension of the second edge portion of the current collector and the protrusion perimeter so that a first distance from the first imaginary extension to a first distant-most tangent of the protrusion perimeter furthest from the first imaginary extension is substantially equal to a second distance from the second imaginary extension to a second distant-most tangent of the protrusion perimeter furthest from the second imaginary extension.

8. The electrochemical cell of claim 7 wherein equal portions of the protrusion reside along each of the contiguous edge portions.

9. The electrochemical cell of claim 7 wherein the first and second edge portions of the current collector are disposed at either a right or an obtuse angle with respect to each other.

10. The electrochemical cell of claim 7 wherein the current collector has at least four edge portions with a protrusion disposed at the junction of each of the contiguous edge portions.

11. The current collector of claim 1 wherein the protrusion is continuously curved from the first edge portion of the current collector to the second edge portion thereof.

* * * * *